United States Patent

Stevens et al.

[11] Patent Number: 5,601,014
[45] Date of Patent: Feb. 11, 1997

[54] LIFT AND TILT TABLE

[75] Inventors: Jay B. Stevens; Richard K. Gronczewski; Bradley R. Holloway; William H. Yeakle, all of Angola, Ind.

[73] Assignee: Vestil Manufacturing Company, Angola, Ind.

[21] Appl. No.: 495,938

[22] Filed: Jun. 28, 1995

[51] Int. Cl.$^6$ .................................................... A47F 5/12
[52] U.S. Cl. ......................................... 108/7; 108/9
[58] Field of Search .................................. 108/7, 1, 5, 6, 108/9, 4; 248/371, 372.1, 398

[56] References Cited

U.S. PATENT DOCUMENTS

| | | | |
|---|---|---|---|
| 308,921 | 12/1884 | McVicar | 108/4 X |
| 956,681 | 5/1910 | Clarke | 108/4 |
| 1,956,546 | 4/1934 | Froelich | 108/7 X |
| 2,006,603 | 7/1935 | Nordmark et al. | 108/5 X |
| 2,524,085 | 10/1950 | Saul, Jr. . | |
| 2,639,541 | 5/1953 | Le Tang | 108/7 |
| 2,944,858 | 7/1960 | Engelsted . | |
| 3,347,399 | 10/1967 | Ensinger | 108/6 X |
| 3,425,365 | 2/1969 | Thoreson et al. . | |
| 4,397,245 | 8/1983 | Washburn | 108/7 |
| 4,402,624 | 9/1983 | Stahl et al. | 108/7 X |
| 4,474,115 | 10/1984 | Carlton | 108/7 |
| 4,705,438 | 11/1987 | Zimmerman et al. . | |
| 5,131,333 | 7/1992 | Karasawa et al. | 108/1 X |
| 5,197,393 | 3/1993 | Yeakle . | |
| 5,199,360 | 4/1993 | Koistinen | 108/1 X |
| 5,345,632 | 9/1994 | Langenaeken et al. . | |

FOREIGN PATENT DOCUMENTS

| | | | |
|---|---|---|---|
| 279086 | 2/1970 | Austria | 108/6 |
| 2523424 | 9/1983 | France | 108/1 |
| 676416 | 1/1991 | Switzerland | 108/1 |
| 650843 | 3/1979 | U.S.S.R. | 108/6 |

*Primary Examiner*—Jose V. Chen
*Attorney, Agent, or Firm*—Gifford, Krass, Groh, Sprinkle, Patmore, Anderson & Citkowski, P.C.

[57] ABSTRACT

A lift and tilt table has a two arm linkage between the load bearing deck and the base. A single extensible cylinder acting between one of the arms and the deck causes the arms to rotate as the cylinder is extended to lift and tilt the table relative to the base. A pivotal connection between one of the arms and the base is slidable along the base from a forward position to an intermediate position and can be locked in the forward position. When the pivotal connection is locked, extension of the cylinder will cause the arms to rotate to simultaneously tilt and lift the deck relative to the base. When the pivotal connection is unlocked, extension of the cylinder will cause the arms to rotate to sequentially tilt and then lift the table relative to the base.

4 Claims, 4 Drawing Sheets

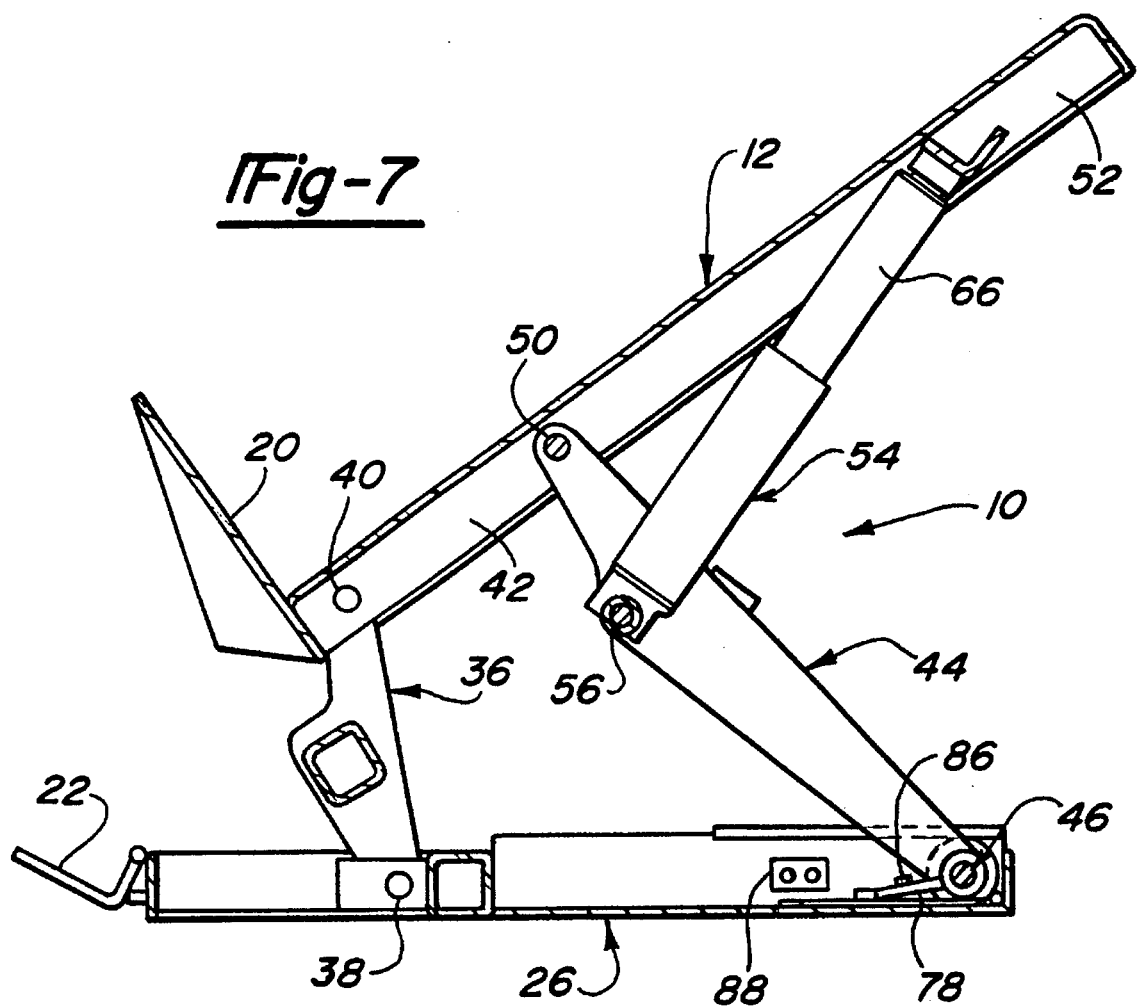

LIFT AND TILT TABLE

BACKGROUND OF THE INVENTION

1. Field of the Invention

This invention relates to a lift and tilt table assembly, and, more particularly, this invention relates to a lift and tilt table assembly which automatically and continuously tilts and lifts the deck without requiring manual changes or adjustments in changing from a tilt to a lifting mode.

2. State of the Art

There is a wide variety of power actuated tables available which can be tilted or raised or which can be both tilted and raised for typical applications such as to locate work pieces or parts at a convenient position for worker access in an assembly line. When the work support deck is capable of both tilting and lifting, the assembly is often complicated requiring several power cylinders and complicated linkages or the lifting must be done independently of the tilting requiring manual adjustments between the two modes such as the lift and tilt post table shown in U.S. Pat. No. 5,197,393.

SUMMARY OF THE INVENTION

The lift and tilt table assembly of the present invention provides full lift and tilt features with a relatively simple quadrilateral linkage which employs a single extensible cylinder for both tilting and lifting. Moreover, the assembly can be selectively operated in two different modes. In one mode, the deck is lifted and tilted at the same time providing maximum lift capability. In the other mode, selected by depressing a pedal on the frame, the deck is first primarily tilted to its fully tilted position, and then the deck lifts. In both modes the top of the deck moves back as it lifts minimizing space requirements and keeping the center of the deck closer to the center of the base. With maximum adjustability, the proper ergonomic level can be obtained for greater productivity and less fatigue.

The lift and tilt assembly according to the invention has a base with a forward and rear portion. A deck having a forward and rear portion is positioned above the base with a forward arm having one of its ends pivotally connected to the forward portion of the base and its other end pivotally connected to the forward portion of the deck. A rear arm has one of its ends pivotally connected at a rear pivotal connection to a rear portion of the base and it has its other end pivotally connected to the deck between the forward and rear portions of the deck. The extensible cylinder has one of its ends pivotally connected between the ends of the rear arm and has its other end pivotally connected to the rear portion of the deck. In its rest position with the extensible cylinder fully retracted, the forward and rear arms have been rotated to a position in which the deck is at its lowest and untilted position which is parallel and adjacent to the base. When the extensible cylinder is extended, the forward and rear arms rotate to tilt and lift the deck. In a preferred embodiment a limit switch is located on the rear arm for stopping the extension of the extensible cylinder when the rear arm has reached a predetermined angular orientation with respect to the base. Typically this is approximately 40°.

In a preferred embodiment, the rear pivotal connection is movable between a rearmost position on the base and an intermediate position located toward the forward portion of the base. A lock is arranged to hold the rear pivotal connection in its rearmost position so that when the extensible cylinder is extended the forward and rear arms will rotate to simultaneously tilt and lift the deck.

A lock release is provided, preferably in the form of a selector pedal mounted to the base, so that when the lock release is actuated the rotation of the forward and rear arms with extension of the cylinder will cause the deck to be first tilted as the rear pivotal connection moves from its rearmost position to its intermediate position. When the full tilt position has been reached, the deck will then be raised.

In a preferred embodiment of the invention, the rear arm includes a pair of spaced rear arm members with one end of extensible cylinder being pivotally connected between the arm members. Also the forward arm includes a pair of spaced forward arm members.

BRIEF DESCRIPTION OF THE DRAWING

The advantages of the present invention will be more apparent from the following detailed description when considered in connection with the accompanying drawing wherein:

FIGS. 3, 4, 5 and 7 are side elevational views of the assembly in its various positions from a rest position to tilted and raised positions, more specifically:

FIG. 3 is an elevation taken along line 3—3 of FIG. 2 showing the assembly in its fully collapsed at rest position with the deck parallel and closely adjacent to the base;

FIG. 4 is the intermediate position of the assembly with the deck being fully tilted by the action of the extensible cylinder when the selector pedal has been depressed;

FIG. 5 shows the assembly in a raised position obtained by further extension of the cylinder after it has been tilted to the position in FIG. 4;

FIG. 7 shows the assembly in its fully tilted and lifted position which has been reached when the extensible cylinder is operated in its simultaneous lift and tilt mode with the selector pedal not in use.

DESCRIPTION OF THE PREFERRED EMBODIMENTS

Figure 1:
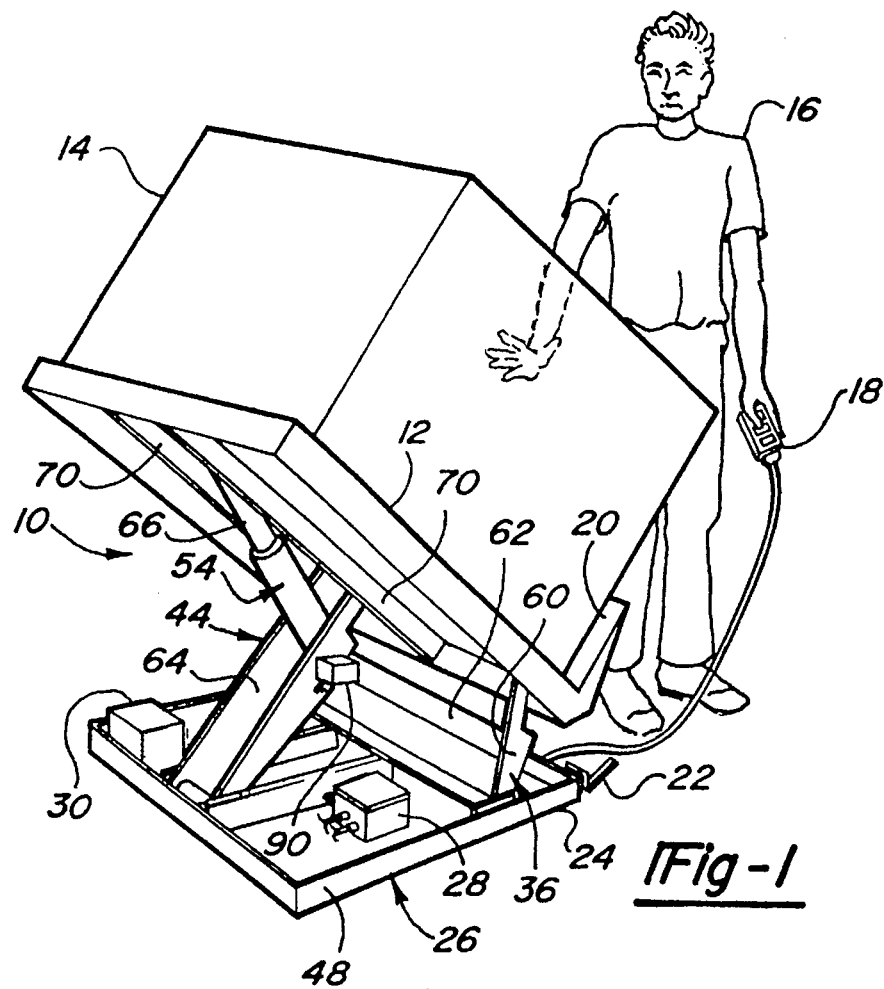
FIG. 1 is a perspective view of the lift and tilt table of this invention shown with a box of parts being held in a lifted and tilted position for easy access by a worker.

Referring to FIG. 1, a preferred embodiment of the lift and tilt table assembly 10 of this invention is illustrated with the deck 12 supporting a box 14 of parts which has been tilted and lifted for access by a worker 16. The worker is shown facing the forward end of the assembly with an up and down, two button control module 18 in his hand. A work support member 20 is carried by the front of forward portion of the deck 12, and a selector pedal 22 is attached to the forward portion 24 of the base 26.

Figure 2:
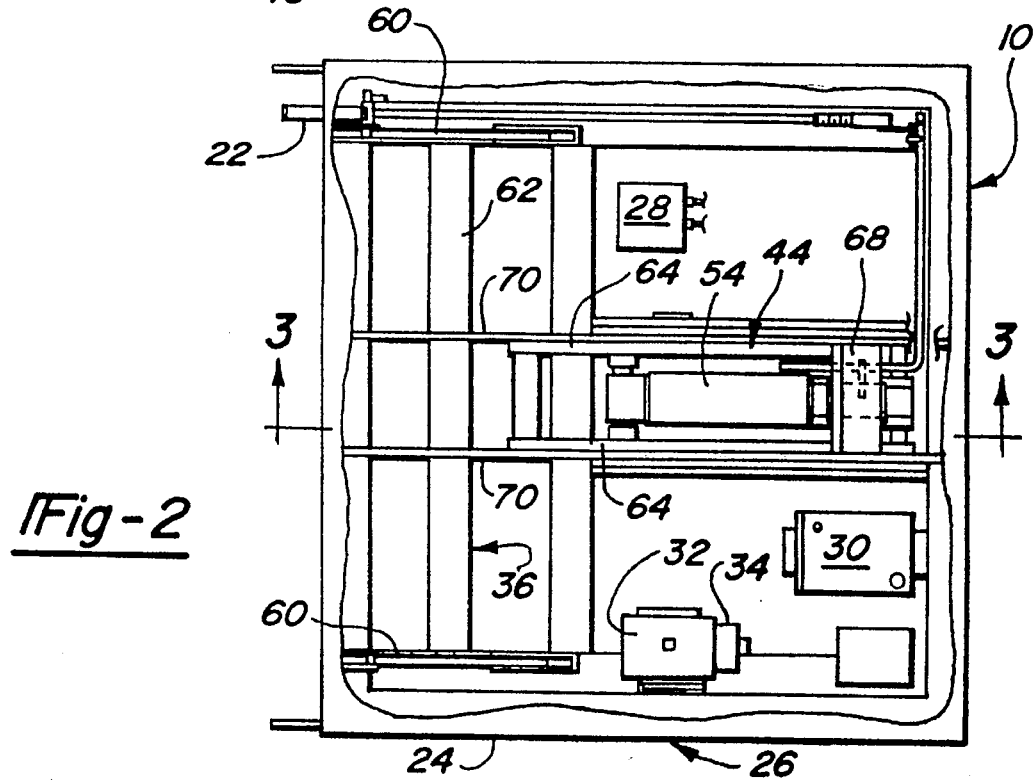
FIG. 2 is a plan view with a portion broken away of the assembly in its fully collapsed position shown the various components of the assembly with conventional wiring and hydraulic connections omitted for clarity.

Referring to FIGS. 1 and 2, an electric control box 28, a hydraulic reservoir 30, an electric motor 32 with an attached pump and valve module 34 are all attached to the base 26. The electrical and hydraulic connections are well known in the art and have not been shown for clarity.

Referring to FIGS. 1–4, the deck 12 is supported above the base 26 at its forward end by a forward arm 36 pivotally connected at 38 to the forward portion 24 of base 26 and is pivotally connected at 40 to a forward portion 42 of the deck 12. The deck is also supported by rear arm 44 having one of its ends pivotally connected at 46 to a rear portion 48 of the base 26 and having its other end pivotally connected at 50 to deck 12 between front and rear portions 42 and 52 of the deck. Additionally, the deck is supported by the extensible hydraulic cylinder 54 which supplies the motive of power for tilting and lifting the deck relative to the base. One end of the extensible cylinder 54 is pivotally connected at 56 between the ends of rear arm 44 and is pivotally connected at 58 to the rear portion 52 of the deck 12.

The forward arm 36 is constructed with a pair of widely spaced forward arm plates or members 60 joined by a transverse square beam 62. The rear arm 44 is constructed with a pair of rear arm plates or members 64 with the extensible cylinder 54 located between the two, pivotally connected at 56. The piston end 66 of extensible cylinder 54 is pivotally connected 58 to the angle member 68 between two longitudinally extending beam members 70. The overall construction geometry provides maximum strength and stability.

Figure 3:
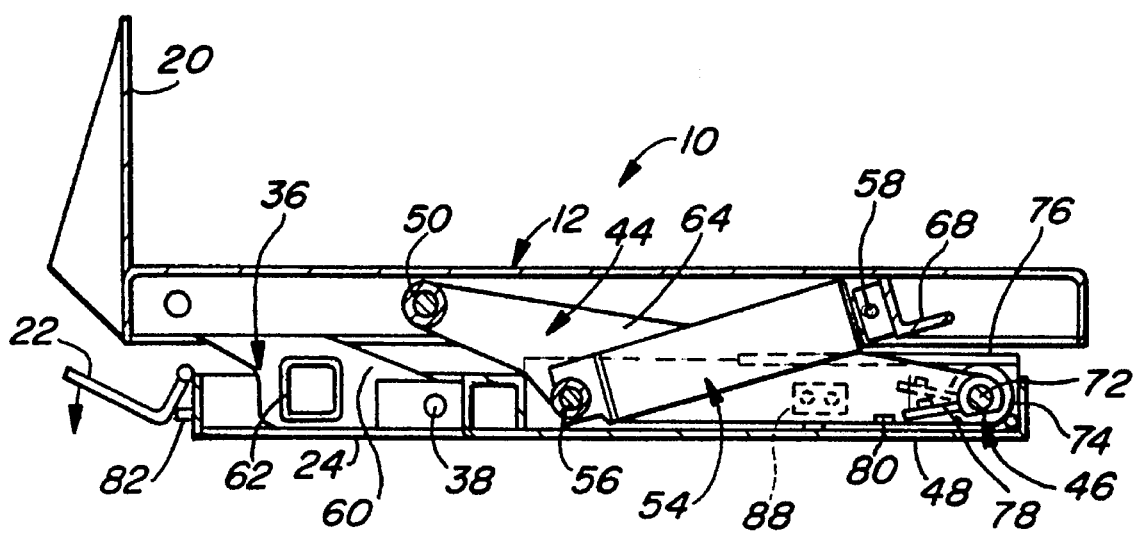
Figure 4:
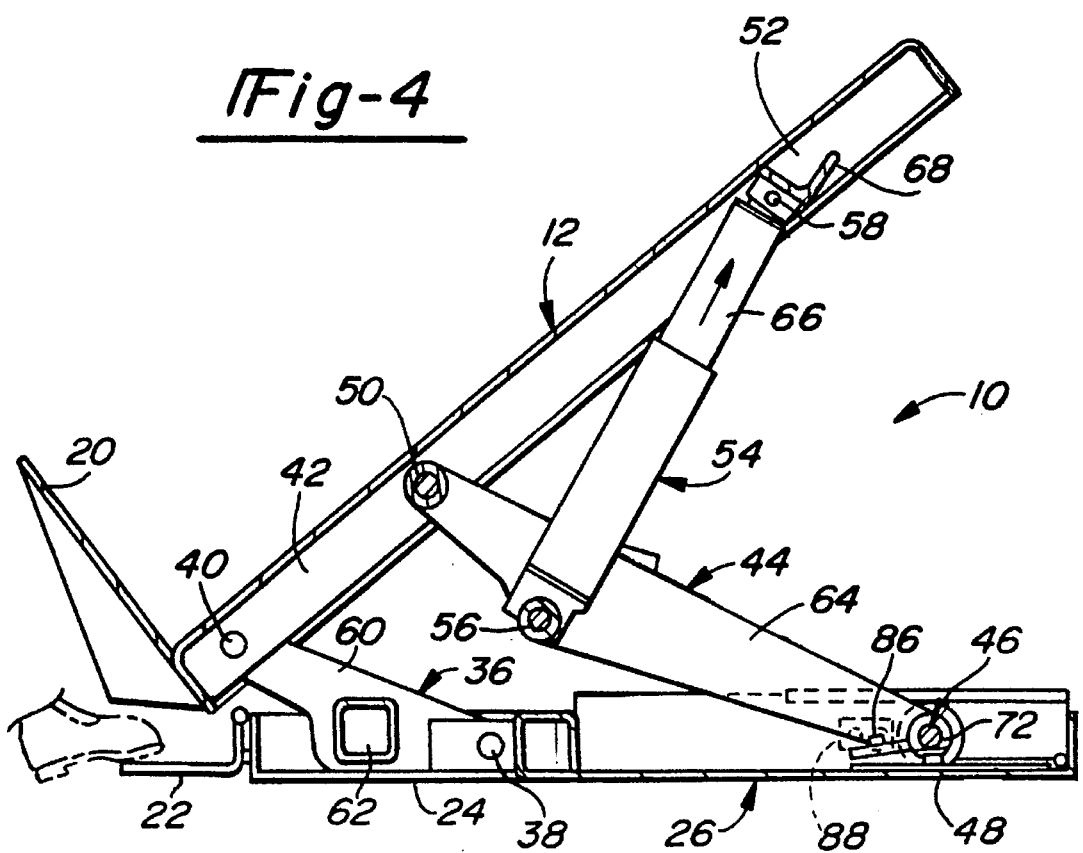
Figure 5:
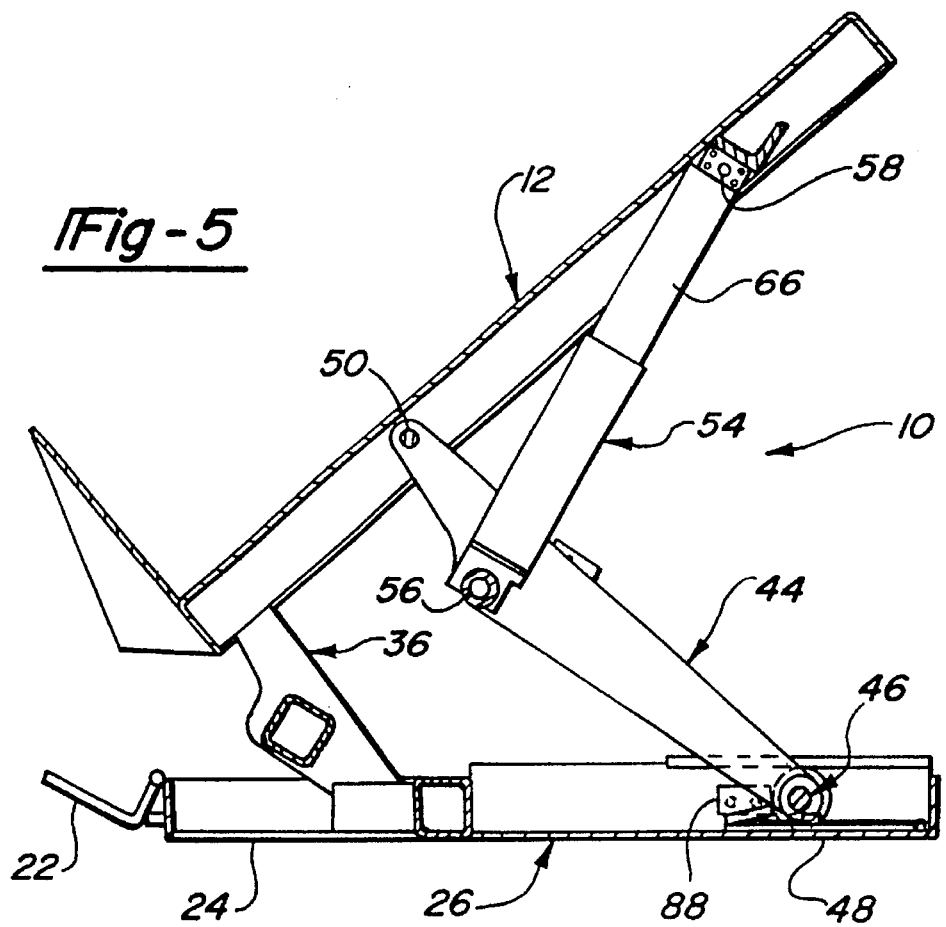
Figure 6:
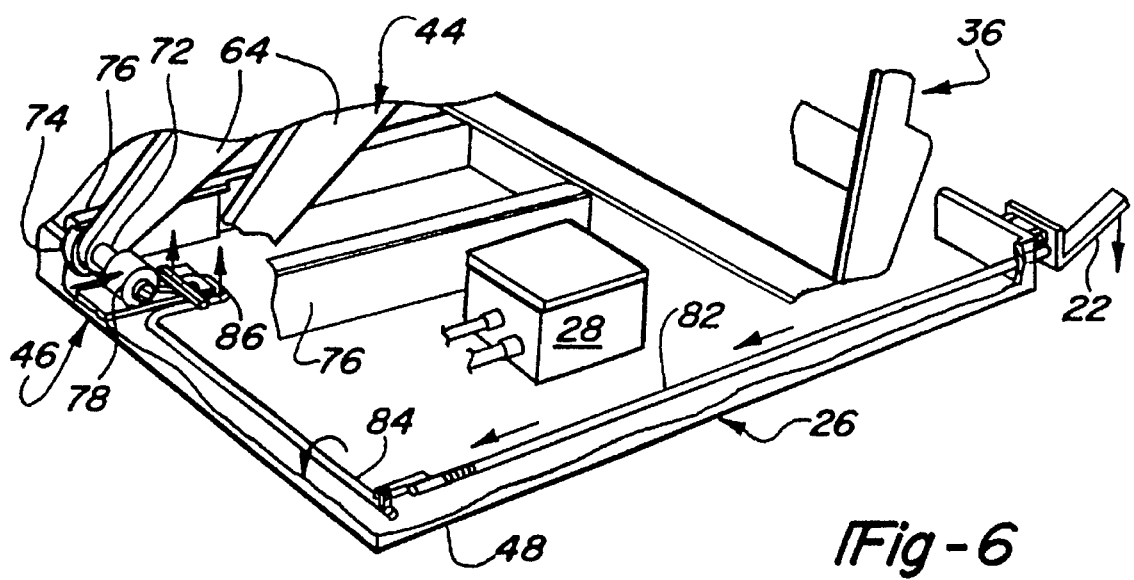
FIG. 6 is a partial perspective view with parts broken away to show the movable rear pivotal connection of the rear arm to the base with its lock and release mechanism.

The pivot connection 46 of the rear arm 36 to the rear portion 48 of the base 26 is movable by the extensible cylinder 54 between a rearmost position shown in FIGS. 2, 3 and 7 and an intermediate position toward the forward portion 24 of the base 26 shown in FIGS. 4 and 5. Referring primarily to FIG. 6, to accommodate this movement, the pivot pin 72 of pivot connection 46 carries a pair of rollers 74 on the outside of rear arm plates 64, one of which is shown in FIG. 6, which roll in guides 76. The pivot connection 46 is normally maintained in its rearmost position by engagement of locking pawl 78 on pivot pin 72 with lock stop 80, shown in FIG. 3. Lock release is obtained by depressing selector pedal 22 which moves connecting rod 82, pivoting link 84 and raising the stop bar 86 as shown by the arrows in FIG. 6. The pivot connection is then free to move from the rearmost position to the intermediate position by movement of the rear arm 44 by the extensible cylinder 54. The movement of rear pivot connection 46 is arrested by a stop block 88 in its intermediate position.

OPERATION IN THE SIMULTANEOUS TILT AND LIFT MODE WITH SELECTOR PEDAL NOT IN USE

Referring to FIGS. 3 and 7, when the selector pedal is not depressed, the rear pivotal connection 46 will remain stationary at its rearmost position causing extensible cylinder 54 to simultaneously lift and tilt the deck 12. When the hydraulic system is actuated by pressing a UP button on the control module 18, the cylinder 54 extends causing the rear arm 44 to rotate relative to the deck 12, necessarily moving the deck 12 to the right as viewed in FIG. 3. This motion to the right causes the forward arm 36 to be rotated causing the forward portion 42 of the deck 12 to lift at the same time as the rest of the deck 12 is being rotated. The shorter length of the forward arm 36 causes this lifting to be less than that caused by the rear arm 44 thus causing the deck 12 to simultaneously tilt as it lifts as seen in FIG. 7.

OPERATION IN THE SEQUENTIAL TILT AND THEN LIFT MODE WITH THE SELECTOR PEDAL DEPRESSED

Referring to FIGS. 3, 4 and 5, when the selector pedal is depressed, the rear pivotal connection 46 is free to move from its rearmost position shown in FIG. 3 to its intermediate position shown in FIG. 4. When the hydraulic system is actuated by pressing the UP button on the control module 18, the cylinder 54 extends causing the rear arm 44 to rotate about its attaching point 50 to the deck 12. This causes the deck 12 to be rotated about its attaching point 40 to the forward arm 36 causing the deck 12 to tilt as seen in FIG. 4. The rollers 74 move in tracks 76, moving the rear pivot point 46 to the left, allowing this free rotation at 40 without lifting until the rollers hit the stop block 88 at which time, the forward lift arm 36 begins to rotate causing the front portion 42 of the deck 12 to elevate as seen in FIG. 5. Thus this mode with the pedal depressed is primarily a tilting mode with moderate lift once the deck is fully tilted.

As seen in FIG. 1, a mercury switch 90 on the rear arm 44 is used to limit the total tilt by shutting off power to the motor 32 when a predetermined tilt angle has been reached even though the UP button may still be depressed. This angle is set at 40°, and the switch will operate at the extreme end of either the simultaneous tilt and lift cycle or the sequential tilt and lift cycle.

As previously mentioned, the typical electrical circuit and the hydraulics form no part of this invention and are well known in the art. The control module 18 contains a simple UP and DOWN button. Pressing the UP button starts the electric motor 32 turning the hydraulic pump contained in the pump and valve module 34 to deliver oil from the reservoir 30 through a check valve in the module to the cylinder 54. When the UP button is released, the cylinder will maintain its position with the load on the platform with the check valve preventing back flow of oil to the pump circuit. When the DOWN button is pushed, a solenoid valve in the module will open to return the oil from the cylinder to the reservoir, allowing the table to retract to its at-rest position.

We claim:

1. A lift and tilt table assembly comprising:

a base having forward and rear portions;

a deck having forward and rear portions;

a forward arm having one of its ends pivotally connected to the forward portion of said base and having its other end pivotally connected to the forward portion of said deck;

a rear arm having one of its ends pivotally connected at a rear pivotal connection to the rear portion of said base and having its other end pivotally connected to said deck between said forward and rear portions of said deck, said rear pivotal connection being movable between a rearmost position on said base and an intermediate position towards said forward portion of said base;

an extensible cylinder having one of its ends pivotally connected between the ends of said rear arm and having its other end pivotally connected the rear portion of said deck;

a lock arranged to hold said rear pivotal connection in said rearmost position when said lock is in a locked condition;

a lock release for releasing said lock; and wherein when said extensible cylinder is not extended, said forward and rear arms are both rotated to position said deck at its lowest and untilted position, parallel and adjacent to said base; when said extensible cylinder is being extended with said lock being in its locked condition, said forward and rear arms will rotate to simultaneously tilt and lift said deck, and when said lock release is actuated releasing said lock, and said extensible cylinder is extended, said forward and rear arms will rotate and said rear pivotal connection will move from said rearmost position to said intermediate position so that said deck will be sequentially tilted and raised.

2. The table assembly according to claim 1 wherein said lock release includes a selector pedal mounted to said base and linkage connecting said selector pedal to said lock whereby when said selector pedal is depressed, said lock is released so that said rear pivotal connection can move between said rearmost and said intermediate positions.

3. The table assembly according to claim 1 including a stop mounted on said frame for stopping the movement of said rear pivotal connection at said intermediate position.

4. The table assembly according to claim 3 wherein said rear pivotal connection includes a roller which rolls in a track connected to said frame when said rear pivotal connection moves between said rearmost and said intermediate positions as said extensible cylinder is extended and retracted.

* * * * *